UNITED STATES PATENT OFFICE.

ORAZIO LUGO, OF FLUSHING, NEW YORK.

IMPROVEMENT IN PROCESSES OF PURIFYING AND INCREASING THE ILLUMINATING POWER OF GAS.

Specification forming part of Letters Patent No. 209,698, dated November 5, 1878; application filed October 22, 1878.

*To all whom it may concern:*

Be it known that I, ORAZIO LUGO, of Flushing, Long Island, in the county of Queens and State of New York, have invented certain new and useful Improvements in Purifying and Increasing the Illuminating Power of Gas; and I do hereby declare that the following is a full, clear, and exact description of the invention, which will enable others skilled in the art to which it appertains to make and use the same.

My invention consists, first, in purifying gas by passing the same through bone-black or animal-charcoal, whereby foreign substances—such as sulphur and ammoniacal compounds, &c.—are separated from the gas; second, in purifying and carbureting gas at a single operation by passing it through bone-black or animal-charcoal which has been impregnated or saturated with hydrocarbons.

Illuminating-gas is now manufactured by the destructive distillation of coal and by purifying the products of such distillation by passing them through water, lime, and oxide of iron, &c.

Illuminating-gas is also manufactured by the decomposition of steam or water in contact with highly-heated carbon. This gas, generally known as "water-gas," is carbureted by means of or with hydrocarbons, after which it is heated in retorts to a high degree of heat, and then purified by about the same means as those applied to the purification of gas produced by the destructive distillation of coal.

Notwithstanding the known processes applied for the purification of gases, large amounts of impurities—such as sulphur, ammoniacal, and other compounds—remain in the gas, which thereby becomes destructive to health and property. By the application of my process such objectionable impurities are removed, and this I effect by passing the gas after it leaves the hydraulic main through bone-black or animal-charcoal contained in filters, tanks, or other suitable vessels, which I call "purifiers." The number or capacity of said purifiers depends upon the quantity of gas to be purified. The bone-black or animal-charcoal contained in these purifiers decomposes and absorbs the ammoniacal and sulphur compounds from the gas, and also deodorizes it. After a certain length of time the bone-black or animal-charcoal loses its power of absorbing said impurities, and then it is washed with steam or water and revivified in the same manner as in sugar-refineries. By this operation its purifying power is restored, and it is fit to be used over again.

The wash-waters from the char are valuable, as they contain ammoniacal salts, which are easily obtained from the water by evaporation.

In the manufacture of water-gas as referred to above, I proceed in either of the following manners: I either pass the gas, after it leaves the generators, through filters or other suitable vessels filled with bone-black or animal-charcoal for the sole object of purifying it, as described in the case of coal-gas, or I impregnate or saturate the char contained in such filters or purifiers with hydrocarbons for the purpose of purifying and carbureting the gas at a single operation, after which it may or may not undergo the usual process of superheating or so-called "fixing;" or I may also pass the already-carbureted water-gas through purifiers containing bone-black or animal-charcoal.

So far I have described the application of my invention to the manufacture of gas, and I now proceed to show its application to the purification of all kinds of illuminating-gases by placing vessels containing bone-black or animal-charcoal in every place where gas is consumed. These vessels or purifiers are so situated that the gas can enter them either before going into the meter or after having passed through the meter.

I can, of course, use one or more of these purifiers, some of which may only contain bone-black or animal-charcoal, while one or more of them may contain bone-black or animal-charcoal saturated or impregnated with a suitable hydrocarbon for the purpose of further increasing the illuminating power of the gas.

The animal-charcoal or bone-black may be used alone; but if combined with other substances, such should be chosen as will not detract from the properties of the bone-black or prevent its advantageous revivification.

What I claim as my invention is—

1. The process of purifying gas, which consists in passing the same through animal-charcoal or bone-black, substantially as described.

2. The process of purifying and enriching gas at a single operation, which consists in passing the same through animal-charcoal or bone-black which has been impregnated or saturated with a suitable hydrocarbon, substantially as described.

In testimony that I claim the foregoing as my own I hereto affix my signature in presence of two witnesses.

ORAZIO LUGO.

Witnesses:
E. B. CLARK,
T. W. DECASTRO.